United States Patent
Weng et al.

(10) Patent No.: US 6,271,301 B1
(45) Date of Patent: *Aug. 7, 2001

(54) POLYVINYL CHLORIDE ELASTOMERS

(75) Inventors: Dexi Weng, Cumberland; John C. Andries, E. Greenwich; Keith G. Saunders, Cumberland, all of RI (US)

(73) Assignee: Teknor Apex Company, Pawtucket, RI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,603

(22) Filed: Jun. 22, 1998

Related U.S. Application Data

(60) Provisional application No. 60/055,831, filed on Aug. 15, 1997.

(51) Int. Cl.[7] .............................. C08J 5/10; C08K 3/00; C08L 27/00
(52) U.S. Cl. ..................... 524/527; 524/522; 524/296; 524/318; 524/275; 524/378; 525/233
(58) Field of Search ................. 525/233; 524/296, 524/297, 318, 284, 275, 277, 378, 379, 522, 527

(56) References Cited

U.S. PATENT DOCUMENTS

| | | | |
|---|---|---|---|
| 4,435,532 | * 3/1984 | Thormer et al. | 524/92 |
| 5,362,787 | 11/1994 | Ngoc et al. | 524/297 |
| 5,552,468 | 9/1996 | Ngoc et al. | 524/297 |
| 5,721,024 | * 2/1998 | Carmen et al. | 428/35.2 |
| 5,816,940 | * 10/1998 | Hayashi et al. | 473/359 |

* cited by examiner

Primary Examiner—Samuel A. Acquah
Assistant Examiner—U. K Rajguru
(74) Attorney, Agent, or Firm—Fish & Richardson P.C.

(57) ABSTRACT

Thermoplastic elastomers including a polyvinyl chloride and a nitrile rubber additive are disclosed. The nitrile rubber additive can be crosslinked and/or essentially free of plasticizer. The thermoplastic elastomers can include additional materials, such a copolyester and/or a plasticizer. The thermoplastic elastomers can be soft, elastomeric and/or oil resistant. The thermoplastic elastomers can have good low temperature properties. The thermoplastic elastomers can have good flame retardant, smoke suppressant and/or char forming properties.

17 Claims, No Drawings

POLYVINYL CHLORIDE ELASTOMERS

CROSS REFERENCE TO RELATED APPLICATIONS

This application claims benefit from provisional application Ser. No. 60/055,831 filed Aug. 15, 1997.

BACKGROUND OF THE INVENTION

The invention relates to thermoplastic elastomers that include polyvinyl chloride and a nitrile rubber additive.

Thermoplastic elastomers are useful in a variety of applications such as, for example, automotive products, grips, seals, gaskets, constant velocity joint boots and wire insulation, cable insulation and jacketing.

Thermoplastic elastomers have been formed from block copolymers or blends of thermoplastics and elastomers. Examples of block copolymer thermoplastic elastomers include styrenic block copolymers, polyolefin block copolymers, thermoplastic polyurethane block copolymers, polyamide block copolymers and polyester block copolymers. Thermoplastic elastomers formed from blends of thermoplastics and elastomers include thermoplastic polyolefin physical blends and thermoplastic vulcanizates.

SUMMARY OF THE INVENTION

The invention relates to thermoplastic elastomers that include polyvinyl chloride and a nitrile rubber additive. The nitrile rubber additive can be crosslinked. The thermoplastic elastomers can also include other materials such as a copolyester and/or a plasticizer.

The thermoplastic elastomers can be soft, elastomeric and/or oil resistant. The thermoplastic elastomers can have relatively low brittle points. The thermoplastic elastomers can have good smoke suppressant, flame retardant and/or char forming properties.

In one aspect, the invention features a thermoplastic elastomer that includes a polyvinyl chloride and a nitrile rubber. The thermoplastic elastomer has a compression set of from about 20 to about 50 and a shore A hardness of no greater than about 60. The thermoplastic elastomer retains its integrity when immersed in ASTM #1 oil for a period of about three days at a temperature of about 125° C. or when immersed in ASTM #3 oil for a period of about three days at a temperature of about 125° C.

In another aspect, the invention features a thermoplastic elastomer that includes a polyvinyl chloride and a nitrile rubber additive. The polyvinyl chloride has a weight average molecular weight of at least about 100,000.

In a further aspect, the invention features a thermoplastic elastomer that includes a polyvinyl chloride, a crosslinked nitrile rubber additive and at least about 105 parts of a plasticizer per 100 parts of the polyvinyl chloride.

In yet a further aspect, the invention features a method of making a molded article. The method includes combining a polyvinyl chloride and a nitrile rubber additive to form a thermoplastic elastomer composition. The method further includes injection molding the thermoplastic elastomer composition to form the molded article.

In still a further aspect, the invention features a method of making a thermoplastic elastomer composition. The method includes combining a polyvinyl chloride with a crosslinked nitrile rubber additive.

In another aspect, the invention features a thermoplastic elastomer composition that includes a polyvinyl chloride and a nitrile rubber additive. The thermoplastic elastomer has a brittle point of no greater than about −50° C.

In yet another aspect, the invention features a thermoplastic elastomer composition that includes a polyvinyl chloride, a nitrile rubber and one or more compounds selected from smoke suppressants, flame retardants and char formers.

The thermoplastic elastomers can be used in applications in which it is desirable to use a material that can be soft and provide low compression set even when the compositions are subjected to high temperatures and/or oils for extended periods of time. Such applications include wire and cable insulation and jacketing, garden hoses, medical devices, automotive parts, and construction materials.

The thermoplastic elastomers can be used in applications in which it is advantageous to use a material that has a relatively low brittle point, such as in a constant velocity joint boot.

The thermoplastic elastomers can be used in applications in which it can be important to use a material that exhibits good smoke suppression, good flame retardancy and/or good char forming properties. These applications include wire and cable insulation and jacketing.

DESCRIPTION OF THE PREFERRED EMBODIMENTS

The thermoplastic elastomers include at least one polyvinyl chloride and at least one a nitrile rubber additive. The thermoplastic elastomers can further include additional compounds such as a copolyester and/or a plasticizer.

The thermoplastic elastomers can have a relatively low compression set. When a low compression set is desirable, the thermoplastic elastomers preferably have a compression set of from about 20 to about 50, more preferably from about 25 to about 45, and most preferably from about 30 to about 40 as measured according to the ASTM D-395 test at 70° C.

The thermoplastic elastomers can be comparatively soft. When good softness is advantageous, the thermoplastic elastomers preferably have a shore A hardness of no greater than about 60, more preferably from about 30 to about 60, and most preferably from about 40 to about 50 as measured according to ASTM D-746 at 70° C. after a 15 second dwell.

In some instances, the thermoplastic elastomers may be exposed to oils for extended periods of time, so it can be advantageous for the thermoplastic elastomers to have good oil resistant properties. In these instances, it is preferable that, when immersed in ASTM #1 oil for a period of about three days at a temperature of about 125° C. or when immersed in ASTM #3 oil for a period of about three days at a temperature of about 125° C., the chemical and physical properties of the thermoplastic elastomers do not undergo any substantial changes so that the thermoplastic elastomer retains its integrity. In some embodiments, when the thermoplastic elastomer is immersed in ASTM #1 oil for a period of about three days at a temperature of about 125° C. and when the thermoplastic elastomer is immersed in ASTM #3 oil for a period of about three days at a temperature of about 125° C., the chemical and physical properties of the thermoplastic elastomer do not undergo any substantial changes so that the thermoplastic elastomer retains its integrity.

The thermoplastic elastomers can have relatively low brittle points. When a low brittle point is desirable, the thermoplastic elastomers preferably have a brittle point of no greater than about −50° C., more preferably no greater than about −55° C., and most preferably no greater than about −60° C. as measured according to ASTM D-746.

As used herein, "polyvinyl chloride" refers to omopolymers of vinyl chloride, as well as polymerization roducts of vinyl chloride and one or more co-monomers. Examples of polyvinyl chlorides include copolymers of vinyl chloride and ethylene and copolymers of vinyl chloride and propylene. The polyvinyl chloride resin can also be the polymerization product of vinyl chloride and an ester monomer having the formula $H_2C=C(R^1)C(=O)OR^2$, where $R^1$ and $R^2$ are, independently, $C_{1-12}$ alkyl. An example of such a resin is a copolymer of a vinyl chloride monomer and a methyl methacrylate monomer. These resins may be used alone or in combination. Polyvinyl chlorides may or may not include an internal plasticizer (i.e., a comonomer that is copolymerized with vinyl chloride monomer).

The polyvinyl chloride can have a relatively high weight average molecular weight. Preferably, the polyvinyl chloride has a weight average molecular weight of at least about 100,000, more preferably at least about 110,000, and most preferably from about 110,000 to about 200,000.

The polyvinyl chlorides preferably have a degree of polymerization of at least about 1500, more preferably at least about 1650, and most preferably from about 1650 to about 4350.

In certain embodiments, the thermoplastic elastomers can include more than one polyvinyl chloride. These polyvinyl chlorides can have different molecular weights and/or different molecular structures. For example, the thermoplastic elastomers can include two different polyvinyl chlorides with the same molecular structure and different molecular weights, or the thermoplastic elastomer can include two different polyvinyl chlorides with the same molecular weight and different molecular structures. Alternatively, the thermoplastic elastomers can include two different polyvinyl chlorides with different molecular structures and different molecular weights.

The amount of nitrile rubber additive can be selected so that the thermoplastic elastomer has a comparatively low compression set. Based on 100 parts of polyvinyl chloride, the thermoplastic elastomer should include at least about 100 parts nitrile rubber additive.

Preferably, based on 100 parts of polyvinyl chloride, the thermoplastic elastomer includes from about 100 parts to about 230 parts nitrile rubber additive, more preferably from about 110 parts to about 200 parts nitrile rubber additive, and most preferably from about 110 parts to about 150 parts nitrile rubber additive.

The nitrile rubber additive can have a relatively low compression set. The nitrile rubber additive can be essentially free of plasticizer. Preferably, the nitrile rubber additive is a crosslinked nitrile rubber additive. A preferred nitrile rubber additive is commercially available from Goodyear Tire and Rubber under the tradename Chemigum P-35.

The thermoplastic elastomers can include a copolyester. Generally, a copolyester is an ester-containing block copolymer. A copolyester can assist in reducing the brittle point of the thermoplastic elastomers. An example of a copolyester is commercially available from DuPont under the tradename Hytrel 8122.

When a low brittle point is advantageous, the thermoplastic elastomers preferably include, for every 100 parts of polyvinyl chloride, from about 5 parts to about 300 parts copolyester, more preferably from about 30 parts to about 200 parts copolyester and most preferably from about 50 parts to about 150 parts copolyester.

The thermoplastic elastomers may include a sufficient amount of plasticizer so that the thermoplastic elastomers have good softness and processability. Preferably, based on 100 parts of polyvinyl chloride, the thermoplastic elastomers include at least about 105 parts plasticizer, more preferably from about 105 parts to about 200 parts plasticizer, and most preferably from about 120 parts to about 180 parts plasticizer.

Examples of plasticizers include phthalates, trimelletates, pyromelletates, azelates, adipates, polyesters, pentaerythritol esters, ethylene/vinyl acetate copolymers, and butyl/acrylate/carbon monoxide terpolymers. The plasticizers may be used alone or in combination. Preferred plasticizers include diisoctyl phthalate, heptylundecyl phthalate and diundecyl phthalate.

To suppress decomposition and/or degradation during the manufacturing processes disclosed herein, the thermoplastic elastomers can include one or more heat stabilizers. A heat stabilizer can be an inorganic compound or an organic compound. A preferred heat stabilizer is commercially available from Matsui Plastics, Japan under the tradename RUP 107.

The thermoplastic elastomers can also contain other ingredients such as colorants, lubricants, antioxidants, co-stabilizers, smoke suppressants, flame retardants, char formers and/or fillers.

Examples of colorants include organic colorants and inorganic colorants. Colorants are available from, for example, Ciba Geigy, BASF, Ferro, ICI, Harwick and Teknor Apex.

Examples of lubricants include stearic acid, metal salts of stearic acid, wax, and polyethylene glycols. The lubricants may be used alone or in combination. Preferred lubricants include stearic acid, available from Henkel Corporation as Stearic Acid GP Grade, and zinc stearate, vailable from The Norac Company under the tradename COAD 21.

Examples of antioxidants include phenolic and thioester antioxidants. A preferred antioxidant is tetrakis[methylene (3,5-di-t-butyl-4-hydroxylhydrocinnamate)]methane, commercially available from Ciba Geigy under the tradename IRGANOX 1010.

A preferred co-stabilizer is tris (2,4-di-tert-butylphenyl) phosphite. One example of such a co-stabilizer is IRGAFOS 168, available from Ciba-Geigy.

Examples of fillers include Kaolin clay, calcium carbonate, and other fillers commonly used in PVC compositions. The fillers may be used alone or in combination.

Examples of flame retardants include aluminum trihydrate, magnesium hydroxide, phosporus compounds and products sold under the tradename Ultracarb which are commercially available from Microfine Minerals.

Examples of char formers include zinc borate char formers. An example of a zinc borate char former is commercially available from Anzon, Incorporated under the tradename ZB-467.

Examples of smoke suppressants include zinc/antimony compounds, zinc/molybdenum compounds and antimony oxide.

The thermoplastic elastomers can be extrusion grade materials or injection molding grade materials.

Injection moldable grade thermoplastic elastomers preferably have a melt flow rate of at least about 3, more preferably at least about 5, and most preferably at least about 10 as measured according to ASTM D-1238 (177° C. 5 kg, g/10 min).

When preparing the thermoplastic elastomers, the components can be mixed using conventional dry blend or wet blend methods, using, for example, a BANBURY® batch mixer, a Farrel Continuous Mixer, or a single or twin screw extruder.

After mixing, the material can be pelletized. When using a BANBURY® batch mixer, the pellets can be formed by passing the mixture through a two-roll mill to form a sheet. The sheet can then be diced into pellets.

Typically, Farrel Continuous Mixers, single screw extruders and twin screw extruders are equipped such that pelletization of the material automatically occurs.

EXAMPLES

Compositions 1–5 were injection molding grade thermoplastic elastomers. Compositions 6–14 were extrusion grade thermoplastic elastomers.

Compositions 1–14 were prepared as follows. The ingredients were mixed in a BANBURY® internal mixer at 60 psi steam pressure, speed 5, for approximately 5 minutes, or until the temperature reached 330–360° F. The resultant mix was milled in a heated two-roll mill, then cooled to room temperature (25° C.). The cooled milled sheets were die cut into small pieces to form test plaques that were tested. All tests were carried out according to the appropriate ASTM protocols.

Air circulating ovens were used to age the compositions; the temperature in the ovens was maintained at the desired setting, with a maximum ±0.2° C. variation.

One preferred composition contained the following ingredients (based on 100 parts of polyvinyl chloride):

| Composition No. 1 | |
|---|---|
| Ingredient | Amount |
| Polyvinyl chloride[1] | 100 |
| Diundecyl phthalate | 137.29 |
| Crosslinked nitrile rubber additive[2] | 107.14 |
| Heat stabilizer[3] | 7.91 |
| Antioxidant[4] | 0.56 |
| Co-stabilizer[5] | 0.56 |
| Lubricant[6] | 0.28 |
| Processing aid[7] | 3.39 |

[1]OXY 280, commercially available from Occidental Chemical
[2]CHEMIGUM P-35, commercially available from Goodyear Tire and Rubber Company
[3]RUP 107, commercially available from Matsui Plastics
[4]IRGANOX 1010, commercially available from Ciba Geigy
[5]IRGAFOS 168, commercially available from Ciba Geigy
[6]Stearic Acid GP Grade, commercially available from Henkel
[7]K-175, commercially available from Polaroid This composition exhibited the following physical properties (as tested according to the designated ASTM procedure):

| | | |
|---|---|---|
| Elongation (%) | 360 | (ASTM D-412) |
| Elongation Retention (%) | 73 | |
| Tensile strength (psi) | 830 | (ASTM D-412) |
| Tensile strength retention (%) | 110 | |
| Brittle Point (° C.) | −51 | (ASTM D-746) |
| Hardness (15 sec. dwell, Shore A) | 45 | (ASTM D-2240) |
| Specific Gravity | 1.1 | |
| Melt Flow Rate (177° C. 5 kg, g/10 min) | 30 | (ASTM D-1238) |
| Compression Set (22 hrs, 70° C.) (%) | 36 | (ASTM D-395) |
| Swell | 1.3 | |
| Dynamic Heat Stability | >60 | |

In the above table, elongation retention is defined as $E_{aged}/E_{original}$. The value for the original elongation ($E_{original}$) is measured before the composition is aged; the value for the aged elongation ($E_{aged}$) is measured after the composition has been subjected to 125° C. heat for 3 consecutive days in ASTM #3 oil. Ideally, a PVC composition that is oil resistant at elevated temperature exhibits an elongation retention of 100%. The closer this value is to 100%, the more heat resistant the composition is.

Similarly, tensile strength retention is defined as tensile strength$_{aged}$/tensile strength$_{original}$, where the value for tensile strength$_{original}$ is measured before aging, and the value for tensile strength$_{aged}$ is measured after aging for 3 consecutive days in ASTM #3 oil. Ideally, a PVC composition that is oil resistant at elevated temperature has a tensile strength retention of 100%. The closer this value is to 100%, the more heat resistant the composition is.

A second preferred composition contained the following ingredients:

| Composition No. 2 | |
|---|---|
| Ingredient | Amount |
| Polyvinyl chloride[1] | 100 |
| Diundecyl phthalate | 121.47 |
| Crosslinked nitrile rubber additive[2] | 100 |
| Heat stabilizer[3] | 7.38 |
| Antioxidant[4] | 0.53 |
| Antioxidant[5] | 0.53 |
| Lubricant[6] | 0.26 |
| Processing aid[7] | 3.16 |

This composition exhibited the following physical properties:

| | | |
|---|---|---|
| Elongation (%) | 330 | (ASTM D-412) |
| Elongation Retention (%) | 83 | |
| Tensile strength (psi) | 860 | (ASTM D-412) |
| Tensile strength retention (%) | 160 | |
| Brittle Point (° C.) | −51 | (ASTM D-746) |
| Hardness (15 sec. dwell, Shore A) | 50 | (ASTM D-2240) |
| Specific Gravity | 1.11 | |
| Melt Flow Rate (177 C. 5 kg, g/10 min) | 24 | (ASTM D-1238) |
| Compression Set (22 hrs, 70° C.) (%) | 38 | (ASTM D-395) |
| Swell | −2.2 | |
| Dynamic Heat Stability | >60 | |

A third preferred composition contained the following ingredients:

| Composition No. 3 | |
|---|---|
| Ingredient | Amount |
| Polyvinyl chloride[1] | 100 |
| Diundecyl phthalate | 107.63 |
| Crosslinked nitrile rubber additive[2] | 93.75 |
| Heat stabilizer[3] | 6.92 |

-continued

Composition No. 3

| Ingredient | Amount |
|---|---|
| Antioxidant[4] | 0.49 |
| Antioxidant[5] | 0.49 |
| Lubricant[6] | 0.25 |
| Processing aid[7] | 2.96 |

This composition exhibited the following physical properties:

| | | |
|---|---|---|
| Elongation (%) | 320 | (ASTM D-412) |
| Elongation Retention (%) | 80 | |
| Tensile strength (psi) | 1030 | (ASTM D-412) |
| Tensile strength retention (%) | 166 | |
| Brittle Point (° C.) | −52 | (ASTM D-746) |
| Hardness (15 sec. dwell, Shore A) | 55 | (ASTM D-2240) |
| Specific Gravity | 1.12 | |
| Melt Flow Rate (177 C. 5 kg, g/10 min) | 15 | (ASTM D-1238) |
| Compression Set (22 hrs, 70° C.) (%) | 41 | (ASTM D-395) |
| Swell | −4.3 | |
| Dynamic Heat Stability | >60 | |

A fourth preferred composition contained the following ingredients:

Composition No. 4

| Ingredient | Amount |
|---|---|
| Polyvinyl chloride[8] | 100 |
| Dioctyl phthalate | 184 |
| Crosslinked nitrile rubber additive[2] | 130 |
| Heat stabilizer[3] | 8 |
| Antioxidant[4] | 0.51 |
| Lubricant[6] | 0.26 |
| Processing aid[7] | 3 |
| Ultraviolet absorber[9] | 0.48 |
| Ultraviolet stabilizer[10] | 0.24 |

[8]OXY 410, commercially available from Occidental Chemical
[9]Chimasorb 944FD, commercially available from Ciba Geigy
[10]Tinuvin P, commercially available from Ciba Geigy This composition exhibited the following physical properties:

| | | |
|---|---|---|
| Elongation (%) | 315 | (ASTM D-412) |
| Elongation Retention (%) | 97 | |
| Tensile strength (psi) | 665 | (ASTM D-412) |
| Tensile strength retention (%) | 200 | |
| Brittle Point (° C.) | −54 | (ASTM D-746) |
| Hardness (15 sec. dwell, Shore A) | 40 | (ASTM D-2240) |
| Specific Gravity | 1.09 | |
| Melt Flow Rate (177 C. 5 kg, g/10 min) | 7 | (ASTM D-1238) |
| Compression Set (22 hrs, 70° C.) (%) | 34 | (ASTM D-395) |
| Swell | −3 | |
| Dynamic Heat Stability | >60 | |

A fifth preferred composition contained the following ingredients:

Composition No. 5

| Ingredient | Amount |
|---|---|
| Polyvinyl chloride[11] | 100 |
| Diundecyl phthalate | 82.33 |
| Crosslinked nitrile rubber additive[2] | 82.33 |
| Heat stabilizer[3] | 6.07 |
| Antioxidant[4] | 0.88 |
| Lubricant[6] | 0.22 |
| Processing aid[7] | 2.6 |

[11]82.33 parts OXY 280 and 17.67 parts OXY 240, both commercially available from Occidental Chemical This composition exhibited the following physical properties:

| | | |
|---|---|---|
| Elongation (%) | 310 | (ASTM D-412) |
| Elongation Retention (%) | 82 | |
| Tensile strength (psi) | 150 | (ASTM D-412) |
| Tensile strength retention (%) | −51 | |
| Brittle Point (° C.) | 60 | (ASTM D-746) |
| Hardness (15 sec. dwell, Shore A) | 60 | (ASTM D-2240) |
| Specific Gravity | 1.14 | |
| Melt Flow Rate (177 C. 5 kg, g/10 min) | 3.6 | (ASTM D-1238) |
| Compression Set (22 hrs, 70° C.) (%) | 42 | (ASTM D-395) |
| Swell | −3.5 | |
| Dynamic Heat Stability | >60 | |

A sixth preferred composition contained the following ingredients:

Composition No. 6

| Ingredient | Amount |
|---|---|
| Polyvinyl chloride[12] | 100 |
| Dioctyl phthalate | 155 |
| Crosslinked nitrile rubber additive[2] | 130 |
| Heat stabilizer[3] | 7.91 |
| Antioxidant[4] | 0.56 |
| Antioxidant[5] | 0.56 |
| Lubricant[6] | 0.28 |
| Processing aid[7] | 3.39 |

[12]OXY 320, commercially available from Occidental Chemical

This composition exhibited the following physical properties:

| | | |
|---|---|---|
| Elongation (%) | 300 | (ASTM D-412) |
| Elongation Retention (%) | 72 | |
| Tensile strength (psi) | 1010 | (ASTM D-412) |
| Tensile strength retention (%) | 85 | |
| Brittle Point (° C.) | −54 | (ASTM D-746) |
| Hardness (15 sec. dwell, Shore A) | 40 | (ASTM D-2240) |
| Specific Gravity | 1.09 | |
| Compression Set (22 hrs, 70° C.) (%) | 32 | (ASTM D-395) |
| Swell | −2.5 | |
| Dynamic Heat Stability | >60 | |

A seventh preferred composition contained the following ingredients:

| Composition No. 7 | |
| --- | --- |
| Ingredient | Amount |
| Polyvinyl chloride[12] | 100 |
| Dioctyl phthalate | 137.29 |
| Crosslinked nitrile rubber additive[2] | 130 |
| Heat stabilizer[3] | 7.91 |
| Antioxidant[4] | 0.56 |
| Antioxidant[5] | 0.56 |
| Lubricant[6] | 0.28 |
| Processing aid[7] | 3.39 |

This composition exhibited the following physical properties:

| | | |
| --- | --- | --- |
| Elongation (%) | 280 | (ASTM D-412) |
| Elongation Retention (%) | 85 | |
| Tensile strength (psi) | 1240 | (ASTM D-412) |
| Tensile strength retention (%) | 65 | |
| Brittle Point (° C.) | −54 | (ASTM D-746) |
| Hardness (15 sec. dwell, Shore A) | 45 | (ASTM D-2240) |
| Specific Gravity | 1.1 | |
| Compression Set (22 hrs, 70° C.) (%) | 32 | (ASTM D-395) |
| Swell | −4 | |
| Dynamic Heat Stability | >60 | |

An eighth preferred composition contained the following ingredients:

| Composition No. 8 | |
| --- | --- |
| Ingredient | Amount |
| Polyvinyl chloride[1] | 100 |
| Diundecyl phthalate | 108 |
| Crosslinked nitrile rubber additive[2] | 94 |
| Heat stabilizer[3] | 6.91 |
| Antioxidant[4] | 1 |
| Lubricant[6] | 0.25 |
| Processing aid[7] | 2.97 |

This composition exhibited the following physical properties:

| | | |
| --- | --- | --- |
| Elongation (%) | 390 | (ASTM D-412) |
| Tensile strength (psi) | 1320 | (ASTM D-412) |
| Brittle Point (° C.) | −45 | (ASTM D-746) |
| Hardness (15 sec. dwell, Shore A) | 50 | (ASTM D-2240) |
| Specific Gravity | 1.12 | |
| Compression Set (22 hrs, 70° C.) (%) | 35 | (ASTM D-395) |
| Swell | 0.5 | |
| Dynamic Heat Stability | 50 | |

A ninth preferred composition contained the following ingredients:

| Composition No. 9 | |
| --- | --- |
| Ingredient | Amount |
| Polyvinyl chloride[13] | 100 |
| Diundecyl phthalate | 105 |
| Crosslinked nitrile rubber additive[2] | 133 |
| Heat stabilizer[3] | 7.75 |
| Antioxidant[4] | 1.12 |
| Lubricant[6] | 0.28 |
| Processing aid[7] | 3.33 |

This composition exhibited the following physical properties:

| | | |
| --- | --- | --- |
| Elongation (%) | 330 | (ASTM D-412) |
| Tensile strength (psi) | 1000 | (ASTM D-412) |
| Brittle Point (° C.) | −45 | (ASTM D-746) |
| Hardness (15 sec. dwell, Shore A) | 55 | (ASTM D-2240) |
| Specific Gravity | 1.12 | |
| Compression Set (22 hrs, 70° C.) (%) | 35 | (ASTM D-395) |
| Swell | 0.6 | |
| Dynamic Heat Stability | 50 | |

A tenth preferred composition contained the following ingredients:

| Composition No. 10 | |
| --- | --- |
| Ingredient | Amount |
| Polyvinyl chloride[12] | 100 |
| Diundecyl phthalate | 85 |
| Crosslinked nitrile rubber additive[2] | 120 |
| Heat stabilizer[3] | 7 |
| Antioxidant[4] | 0.19 |
| Lubricant[6] | 0.25 |
| Processing aid[7] | 3 |

This composition exhibited the following physical properties:

| | | |
| --- | --- | --- |
| Elongation (%) | 240 | (ASTM D-412) |
| Elongation Retention (%) | 77 | |
| Tensile strength (psi) | 1650 | (ASTM D-412) |
| Tensile strength retention (%) | 121 | |
| Brittle Point (° C.) | −41 | (ASTM D-746) |
| Hardness (15 sec. dwell, Shore A) | 60 | (ASTM D-2240) |
| Specific Gravity | 1.12 | |
| Compression Set (22 hrs, 70° C.) (%) | 35 | (ASTM D-395) |
| Swell | −1 | |
| Dynamic Heat Stability | 48 | |

An eleventh preferred composition contained the following ingredients:

| Composition No. 11 | |
| --- | --- |
| Ingredient | Amount |
| Polyvinyl chloride[8] | 100 |
| Dioctyl phthalate | 178.02 |
| Crosslinked nitrile rubber additive[2] | 130 |
| Copolyester[14] | 70 |
| Heat stabilizer[3] | 8.02 |

11

-continued

Composition No. 11

| Ingredient | Amount |
|---|---|
| Antioxidant[4] | 1.50 |
| Lubricant[6] | 0.26 |
| Processing aid[7] | 2.99 |
| Ultraviolet absorber[9] | 0.48 |
| Ultraviolet stabilizer[10] | 0.24 |
| Thermal stabilizer[15] | 5.97 |
| Thermal stabilizer[16] | 4.00 |

[14]Hytrel 8122, commercially available from DuPont
[15]Epoxide soybean oil
[16]Mark 6734, commercially available from Witco Co.

This composition exhibited the following physical properties:

| | | |
|---|---|---|
| Elongation (%) | 391 | (ASTM D-412) |
| Elongation Retention (%) | 31 | |
| Tensile strength (psi) | 923 | (ASTM D-412) |
| Tensile strength retention (%) | 64 | |
| Brittle Point (° C.) | −62 | (ASTM D-746) |
| Specific Gravity | 1.09 | |
| Melt Flow Rate (177C 5 kg, g/10 min) | 3.62 | (ASTM D-1238) |
| Compression Set (22 hrs, 70° C.) (%) | 46 | (ASTM D-395) |

A twelfth preferred composition contained the following ingredients:

Composition No. 12

| Ingredient | Amount |
|---|---|
| Polyvinyl chloride[8] | 100 |
| Dioctyl phthalate | 100 |
| Diundecyl phthalate | 100 |
| Crosslinked nitrile rubber additive[2] | 130 |
| Copolyester[14] | 70 |
| Heat stabilizer[3] | 8.02 |
| Antioxidant[4] | 1.50 |
| Lubricant[6] | 0.26 |
| Processing aid[7] | 2.99 |
| Ultraviolet absorber[9] | 0.48 |
| Ultraviolet stabilizer[10] | 0.24 |
| Thermal stabilizer[15] | 5.97 |
| Thermal stabilizer[16] | 4.00 |

This composition exhibited the following physical properties:

| | | |
|---|---|---|
| Elongation (%) | 339 | (ASTM D-412) |
| Elongation Retention (%) | 37 | |
| Tensile strength (psi) | 718 | (ASTM D-412) |
| Tensile strength retention (%) | 65 | |
| Brittle Point (° C.) | −60 | (ASTM D-746) |
| Specific Gravity | 1.08 | |
| Melt Flow Rate (177C 5 kg, g/10 min) | 9.65 | (ASTM D-1238) |
| Compression Set (22 hrs, 70° C.) (%) | 48 | (ASTM D-395) |

12

A thirteenth preferred composition contained the following ingredients:

Composition No. 13

| Ingredient | Amount |
|---|---|
| Polyvinyl chloride[8] | 100 |
| Polyvinyl chloride[12] | 66.67 |
| Heptylundecyl phthalate | 228.78 |
| Crosslinked nitrile rubber additive[2] | 216.63 |
| Heat stabilizer[3] | 16.67 |
| Antioxidant[4] | 1.90 |
| Lubricant[6] | 0.44 |
| Processing aid[7] | 5.64 |
| Smoke suppressant[17] | 5.00 |
| Flame retardant[18] | 116.67 |
| Char former[19] | 3.33 |

[17]Antimony oxide, commercially available from Anzon, Incorporated
[18]Alcoa C710B, commercially available from Alcoa
[19]ZB-467, commercially available from Anzon, Incorporated This composition exhibited the following physical properties:

| | | |
|---|---|---|
| Elongation (%) | 243 | (ASTM D-412) |
| Elongation Retention (%) | 104 | |
| Tensile strength (psi) | 1364 | (ASTM D-412) |
| Tensile strength retention (%) | 121 | |
| Brittle Point (° C.) | −46 | (ASTM D-746) |
| Specific Gravity | 1.22 | |
| Compression Set (22 hrs, 70° C.) (%) | 27 | (ASTM D-395) |
| Dielectric constant (1 KHz) | 8.55 | (ASTM D-150) |
| Dissipation factor (1 KHz) | 0.0297 | (ASTM D-150) |
| Limiting oxygen index | 26 | (ASTM D-2863) |
| Dynamic heat stability | >60 | |

A fourteenth preferred composition contained the following ingredients:

Composition No. 14

| Ingredient | Amount |
|---|---|
| Polyvinyl chloride[8] | 100 |
| Polyvinyl chloride[12] | 100 |
| Heptylundecyl phthalate | 215.26 |
| Crosslinked nitrile rubber additive[2] | 187.5 |
| Heat stabilizer[3] | 20 |
| Antioxidant[4] | 2.00 |
| Lubricant[6] | 0.50 |
| Processing aid[7] | 5.94 |
| Smoke suppressant[17] | 6.00 |
| Flame retardant[18] | 120.00 |
| Char former[19] | 4.00 |

This composition exhibited the following physical properties:

| | | |
|---|---|---|
| Elongation (%) | 278 | (ASTM D-412) |
| Elongation Retention (%) | 74 | |
| Tensile strength (psi) | 2065 | (ASTM D-412) |
| Tensile strength retention (%) | 76 | |
| Brittle Point (° C.) | −40 | (ASTM D-746) |
| Specific Gravity | 1.25 | |
| Compression Set (22 hrs, 70° C.) (%) | 33 | (ASTM D-395) |
| Dielectric constant (1 KHz) | 8.39 | (ASTM D-150) |

-continued

| | | |
|---|---|---|
| Dissipation factor (1 KHz) | 0.0369 | (ASTM D-150) |
| Limiting oxygen index | 26 | (ASTM D-2863) |
| Dynamic heat stability | >60 | |

Other embodiments are within the claims.

What is claimed is:

1. A thermoplastic elastomer composition, comprising:
a polyvinyl chloride; and
a nitrile rubber additive, wherein the thermoplastic elastomer composition has a compression set of from about 20 to about 50, a Shore A hardness of no greater than about 60, and retains its integrity when immersed in ASTM #1 oil for a period of about three days at a temperature of about 125° C. or when immersed in ASTM #3 oil for a period of about three days at a temperature of about 125° C., and wherein the thermoplastic elastomer composition has a melt flow rate of at least about 3.

2. The thermoplastic elastomer composition according to claim 1, wherein the nitrile rubber additive is crosslinked.

3. The thermoplastic elastomer composition according to claim 1, wherein the polyvinyl chloride has a weight average molecular weight of at least about 100,000.

4. The thermoplastic elastomer composition according to claim 1, further comprising at least about 105 parts of a plasticizer per one hundred parts of the polyvinyl chloride.

5. The thermoplastic elastomer composition according to claim 1, wherein the polyvinyl chloride comprises a first polyvinyl chloride and a second polyvinyl chloride different than the first polyvinyl chloride.

6. The thermoplastic elastomer composition according to claim 1, further comprising a copolyester.

7. The thermoplastic elastomer composition according to claim 1, wherein the thermoplastic elastomer composition has a brittle point of no greater than about −50° C.

8. The thermoplastic elastomer composition according to claim 1, wherein the thermoplastic elastomer composition further includes at least one material selected from the group consisting of smoke suppressants, flame retardants and char formers.

9. A thermoplastic elastomer composition, comprising:
a polyvinyl chloride; and
a nitrile rubber additive, wherein the thermoplastic elastomer has a brittle point of no greater than about −50° C.

10. The thermoplastic elastomer composition according to claim 9, wherein the thermoplastic elastomer has a brittle point of no greater than about −55° C.

11. The thermoplastic elastomer composition according to claim 9, wherein the thermoplastic elastomer has a brittle point of no greater than about −60° C.

12. The thermoplastic elastomer composition according to claim 9, further comprising a copolyester.

13. The thermoplastic elastomer composition according to claim 9, wherein the nitrile rubber additive is crosslinked.

14. The thermoplastic elastomer composition according to claim 9, wherein the polyvinyl chloride has a weight average molecular weight of at least about 100,000.

15. The thermoplastic elastomer composition according to claim 9, further comprising at least about 105 parts of a plasticizer per one hundred parts of the polyvinyl chloride.

16. The thermoplastic elastomer composition according to claim 9, wherein the thermoplastic elastomer composition has a melt flow rate of at least about 3.

17. The thermoplastic elastomer composition according to claim 9, wherein the polyvinyl chloride comprises a first polyvinyl chloride and a second polyvinyl chloride different than the first polyvinyl chloride.

* * * * *

UNITED STATES PATENT AND TRADEMARK OFFICE
CERTIFICATE OF CORRECTION

PATENT NO. : 6,271,301 B1  Page 1 of 1
DATED : August 7, 2001
INVENTOR(S) : Dexi Weng, Ph.D., Keith G. Saunders and John C. Andries It is certified that error appears in the above-identified patent and that said Letters Patent is hereby corrected as shown below:

<u>Column 8,</u>
Line 26, "Brittle Point (°C) 60 (ASTM D-746)" and replace with -- Brittle Point (°C) -60 (ASTM D-746) --.

Signed and Sealed this

Seventh Day of January, 2003

JAMES E. ROGAN
*Director of the United States Patent and Trademark Office*